US006036252A

United States Patent [19]
Hecksel et al.

[11] Patent Number: 6,036,252
[45] Date of Patent: Mar. 14, 2000

[54] AUTOMOTIVE BENCH SEAT WITH FIXED ROLLERS AND LINEAR FLOOR LATCH

[75] Inventors: Phillip J. Hecksel, Belleville; Robert J. Sack, Livonia; Alan D. Novrocki, Plymouth, all of Mich.

[73] Assignee: Lear Corporation, Southfield, Mich.

[21] Appl. No.: 09/009,549

[22] Filed: Jan. 20, 1998

[51] Int. Cl.[7] .................................................. B60N 2/04
[52] U.S. Cl. ........................................ 296/65.03; 296/63
[58] Field of Search ................................. 296/65.03, 63; 297/336, 344.1; 248/503.1

[56] References Cited

U.S. PATENT DOCUMENTS

| | | |
|---|---|---|
| 4,759,580 | 7/1988 | Berlich, Jr. et al. . |
| 4,836,597 | 6/1989 | Izumida . |
| 4,971,379 | 11/1990 | Rumpel et al. . |
| 5,238,285 | 8/1993 | Holdampf et al. . |
| 5,372,398 | 12/1994 | Aneiros et al. . |
| 5,474,311 | 12/1995 | Tyciak et al. ............................. 280/30 |
| 5,482,345 | 1/1996 | Bolsworth et al. . |
| 5,498,051 | 3/1996 | Sponsler et al. . |
| 5,547,242 | 8/1996 | Dukatz et al. . |
| 5,626,391 | 5/1997 | Miller et al. ............................. 297/331 |
| 5,711,505 | 1/1998 | Nemoto ................................... 297/336 |
| 5,911,465 | 6/1999 | Yamamoto et al. ................. 296/65.03 |

*Primary Examiner*—D. Glenn Dayoan
*Assistant Examiner*—Lori L. Coletta
*Attorney, Agent, or Firm*—Brooks & Kushman P.C.

[57] ABSTRACT

A bench seat assembly for a passenger vehicle with a structural floor pan for supporting the bench seat, the bench seat including transversely spaced seat risers, fixed rollers mounted on the risers on each side of the bench seat, the rollers being arranged in pairs on each side of the bench seat in fore-and-aft disposition, the structural floor having fore-and-aft roller wells on each lateral side of the bench seat which receive the rollers when the bench seat is installed. A linear latch mechanism includes a user-actuated member that is coupled to a pair of seat latching hooks on each lateral side of the seat assembly adjacent the rearwardly positioned seat rollers. Anchor elements in the roller wells are engaged by a latch member as the rollers enter the roller wells.

6 Claims, 6 Drawing Sheets

Fig. 9b

AUTOMOTIVE BENCH SEAT WITH FIXED ROLLERS AND LINEAR FLOOR LATCH

TECHNICAL FIELD

The invention relates to automotive seats that are detachable from a floor plan structure of a vehicle passenger compartment.

BACKGROUND OF THE INVENTION

Automotive seat assemblies often include a rearward bench seat that can be removed to increase the cargo-carrying space within the passenger compartment. This adapts the vehicle for transporting bulky items and otherwise enhances the vehicle's utility. Such removable bench seats are found, for example, in recreational vehicles, sport utility vehicles and minivans, as well as other vehicle types where the rear bench seat is accessible from a rear hatch opening in the vehicle body.

Such multiple-purpose seating arrangements must meet the same motor vehicle safety requirements as a permanently installed seat which requires the seat to be fastened to the vehicle body structure securely so that inertia forces to which the seat might be subjected can be accommodated.

Various fastening mechanisms are known in the art for securing removable bench seats while maintaining the capability of absorbing high energy loads. Examples of removable seat assemblies with fastening mechanisms of this type may be seen by referring to U.S. Pat. Nos. 4,759,580 and 4,971,379, each of which discloses a latching mechanism for securing a removable bench seat to the floor pan structure of a motor vehicle. The floor pan structure is provided with seat-anchoring pins which are situated below the surface of the passenger compartment floor and engaged by robust latching devices when the seat is moved by the user into its installed position.

Typically, the latching mechanism comprises a rotatable lever located on each lateral side of the bench seat for pivoting a latching member into a position for engaging an anchor pin. Such arrangements require considerable effort on the part of the user when he or she undertakes the task of removing a seat to enlarge the passenger compartment for carrying cargo.

U.S. Pat. No. 5,372,398 discloses a removable bench seat assembly for an automotive vehicle wherein provision is made for facilitating removal of the bench seat by providing rollers carried on seat pedestals or risers that form a part of the structural frame of the bench seat. As in the case of the earlier designs of the '580 patent and the '379 patent, provision is made in the design of the '398 patent for latching the seat to anchor posts or pins located below the surface of the floor pan. The latching mechanism includes in addition, a rotatable lever at each lateral side of the bench seat. As the lever is rotated by the user, the rollers engage a seat track which raises the seat frame above the plane of the anchor pin. The rotatable lever is connected to latching devices at fore-and-aft locations by a motion transmitting linkage. Thus, when the anchor pins are disengaged, the rollers are capable of supporting the weight of the bench seat, thereby permitting the user to roll the bench seat rearwardly through the rear hatch opening with minimal effort.

The latching mechanism and the roller assembly of the design of the '398 patent has a large number of parts. Because of the complexity of the linkage devices associated with the latches, considerable user skill is required in the manual operation of the rotatable levers at each side of the seat assembly as the user attempts to remove the seat. The design of the '398 patent further requires movable latching elements at both the fore-and-aft locations which are connected together for simultaneous movement by an articulated linkage. Other prior art devices, such as the latch system shown in U.S. Pat. No. 5,482,345, include similar fore-and-aft movable latching mechanisms, but these are independently operable as distinct from the articulated mechanism of the design of the '398 patent.

SUMMARY OF THE INVENTION

It is an objective of the present invention to provide a simplified bench seat latching mechanism that will permit convenient removal of the bench seat through a rear hatch opening in the vehicle passenger compartment and which is capable of securing a bench seat securely in place on a floor pan structure for the vehicle without the necessity for separate user operated movable latching devices at the fore-and-aft locations, thereby greatly simplifying the design and reducing the weight associated with more complex latching mechanisms while providing for maximum convenience for the user during both installation and removal of the seat.

The invention includes fixed rollers located at fore-and-aft positions on each lateral side of the bench seat. The rollers are permanently mounted rotatably on the structural riser for the bench seat and extend below the latching elements that secure the bench seat to the floor pan. The latching mechanism includes a linearly movable member extending from each lateral side of the bench seat support. Each linearly movable member is connected by a motion-transmitting pin and slot connection to a first latch pivoted on a pin that is supported by a fixed member secured to the seat support frame. The latch engages a second latching element as the first latching element travels through a predetermined angular displacement. Upon further motion of the linearly actuated member by the user beyond that predetermined angular displacement, the first latch element will drive a second latch element to its release position, thereby disengaging an anchor pin situated below the surface of the floor pan.

The fixed rollers are arranged to enter roller wells formed in the floor pan at fore-and-aft locations. Each well has an entry ramp for the rollers that is consistent with the path of motion of a forwardly disposed latch as well as the rearwardly disposed latching mechanism, so that the forwardly disposed latch will be guided into its locked position as the latching mechanism at the rearward location snaps into its locking position as the first latching element is rotated by the linear motion of the user actuated member. After the seat is latched in place in this fashion, the linear member is returned to its original position under a spring force so that the first latching element as well as the second latching element become locked to the rearward anchor pin.

BRIEF DESCRIPTION OF THE DRAWINGS

FIG. 9b is a detail view of a clock spring that applies a torque on the latch hook of FIG. 9 tending normally to urge it into a latching position, the view being seen from the plane of section line 9b—9b of FIG. 9a.

DETAILED DESCRIPTION OF THE INVENTION

Figure 1:
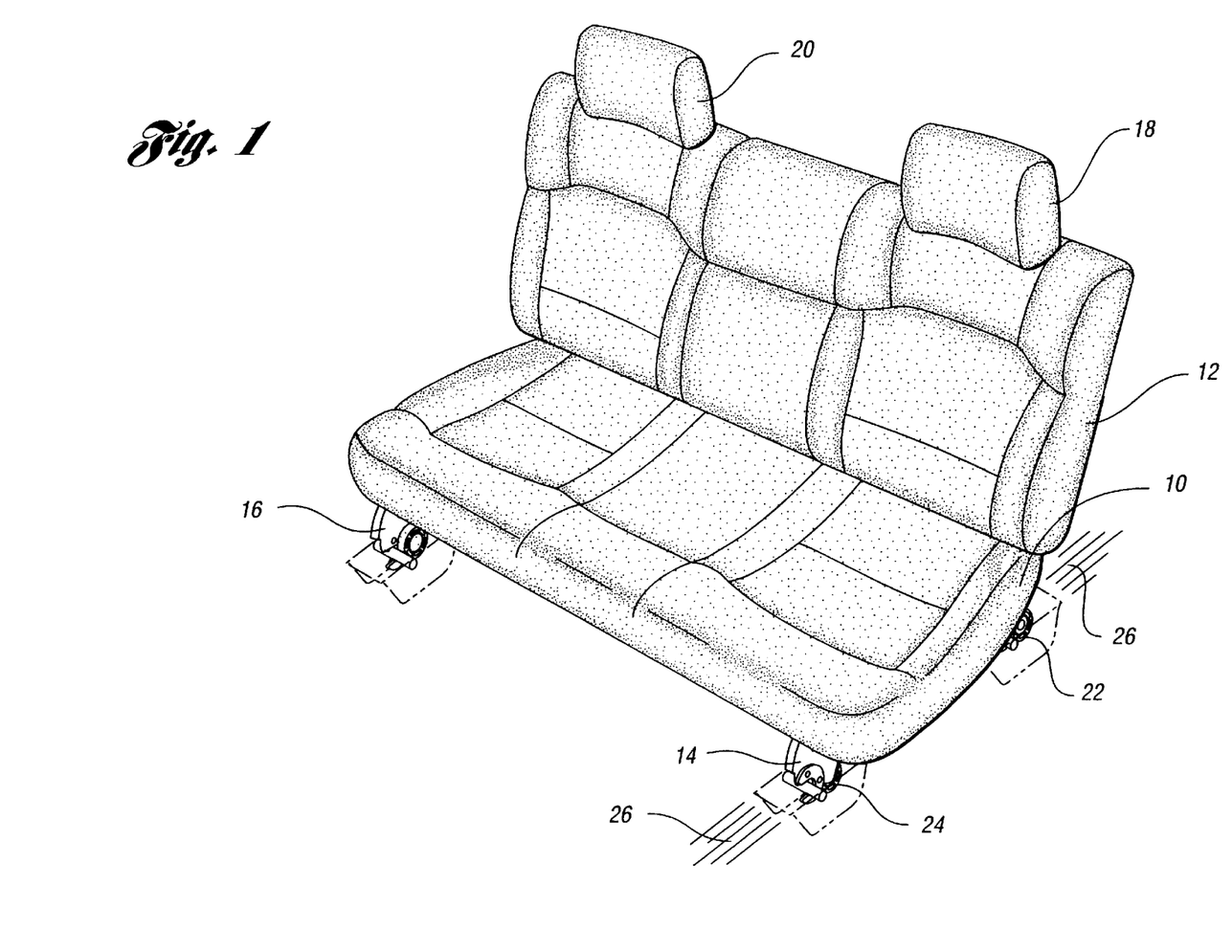
FIG. 1 shows, in perspective, a bench seat assembly having a structural frame and a pedestal that may be latched to a vehicle floor structure.

In FIG. 1, numeral 10 designates a lower seat portion of a bench seat assembly. It includes a frame covered by cushioned material and upholstery. A seat back portion 12 of the bench seat assembly is hinged at its lower margin to the rearmost portion of the frame for the lower seat portion 10. A portion of a seat riser for the left side of the bench seat assembly of FIG. 1 is shown at 14. A corresponding riser for the right side of the bench seat assembly is shown at 16.

The bench seat assembly includes headrests 18 and 20 at the upper margin of the seat back portion 12. Seat back portion 12 can be folded forward over the lower seat portion 10 if increased storage area in the vehicle passenger compartment is needed. Regardless of whether the bench seat assembly is foldable or has a fixed upright seat back portion, provision is made for conveniently removing the seat back assembly. For this purpose, rollers 22 and 24 are rotatably mounted on the riser structure, shown in part at 14 at the left side of the seat assembly. Corresponding rollers are provided at the right side of the seat assembly. The rollers are engageable with a vehicle floor pan 26, which is a structural component of the vehicle passenger compartment.

Typically, the seat assembly shown in FIG. 1 would be mounted rearwardly of the front driver seat and front passenger seat in a vehicle passenger compartment. It also may be used, however, as a third row seat situated in back of a second row rear seat of a vehicle passenger compartment.

Figure 2:
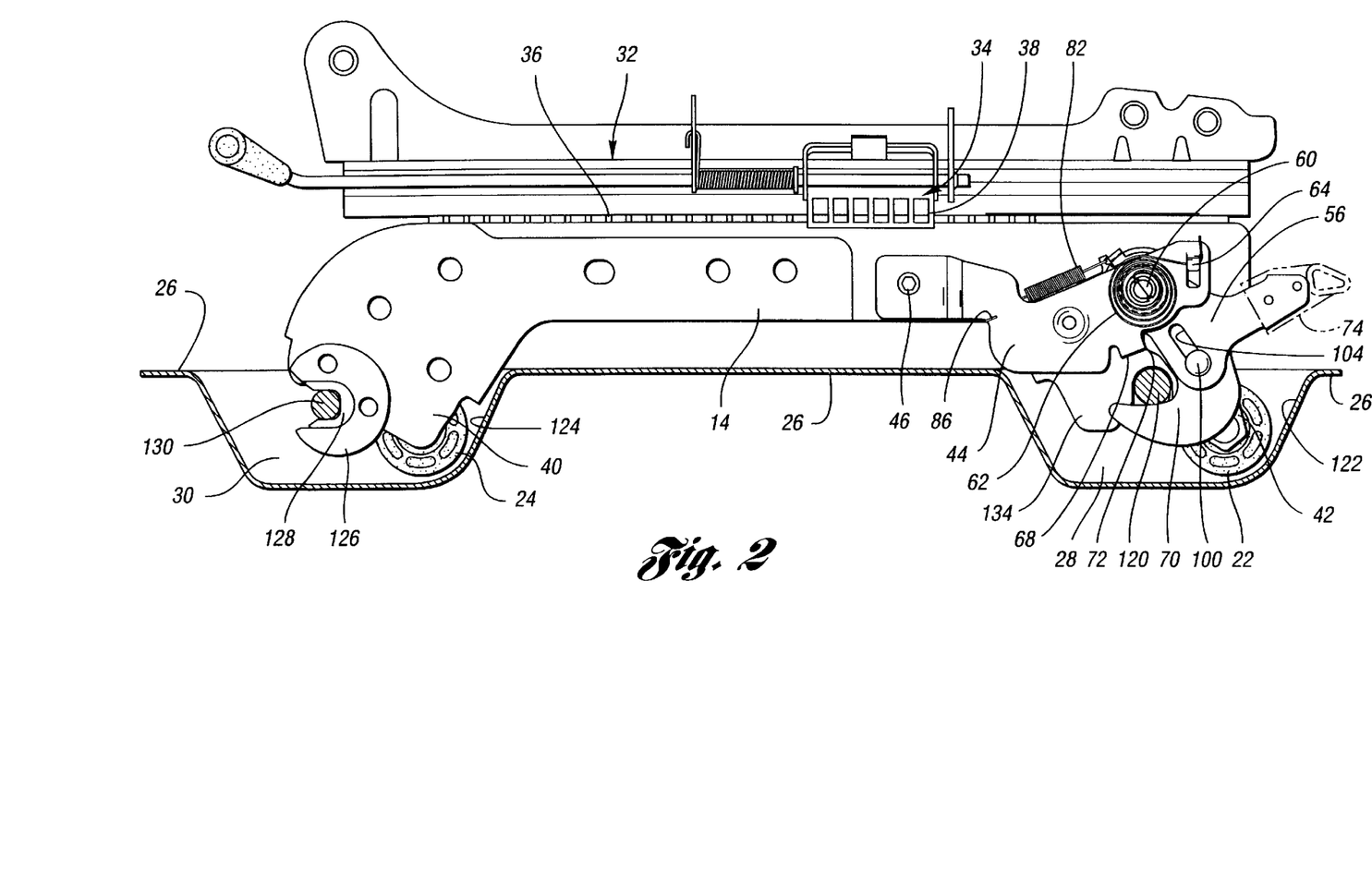
FIG. 2 is a side elevation view partly in cross-section showing a side view of the bench seat structural frame and bench seat latching mechanism of the invention.

Shown in FIG. 2 is a more detailed view of the riser structure and the latching mechanism for the bench seat of FIG. 1. The floor pan structure 26, as seen in FIG. 2, has a rearward roller well 28 and a forward roller well 30. These respectively receive rear seat roller 22 and forward seat roller 24. The left riser has a structural channel member that extends in a fore-and-aft direction under the structural frame for the lower seat portion 10 of the bench seat assembly.

The structural frame is indicated generally in FIG. 2 by reference numeral 32. It comprises an adjustable track that movably supports the seat frame 32 on the riser 14. Since this does not constitute a part of the present invention, it will not be described particularly in this disclosure. A driver-controlled adjustment mechanism 34 for adjusting the position of the seat frame relative to the riser includes a multiple position detent plate 36 having detent recesses that receive seat locking elements 38 carried by the seat frame so that the seat frame can be locked relative to the riser 14 in any of several operable positions along a fore-and-aft seat motion path.

The forward seat roller 24 is journaled for rotation about a fixed axis on a forward flange 40 that forms an integral part of the riser 14. Similarly, rear wheel 22 is rotatably mounted on a fixed axis and is supported on a bracket 42 that also forms an integral part of the riser 14.

Figure 6:
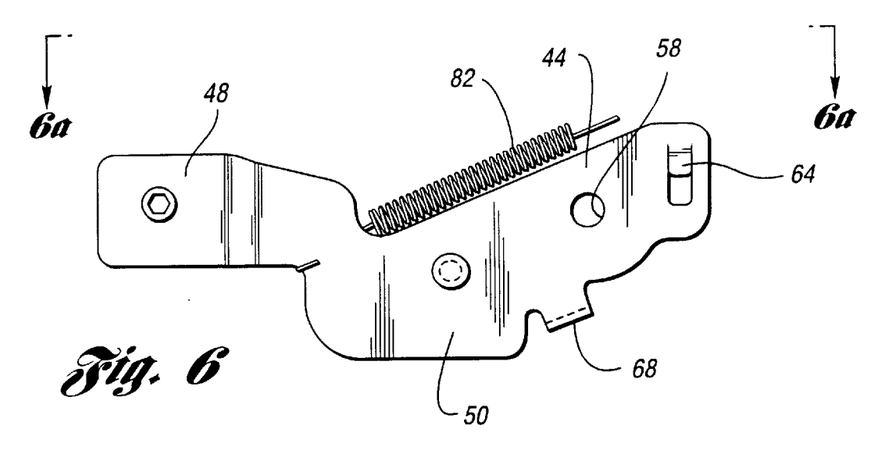
FIG. 6 is a side view of a fixed latch plate that forms a part of the latching assembly of FIGS. 1–5.
Figure 6A:
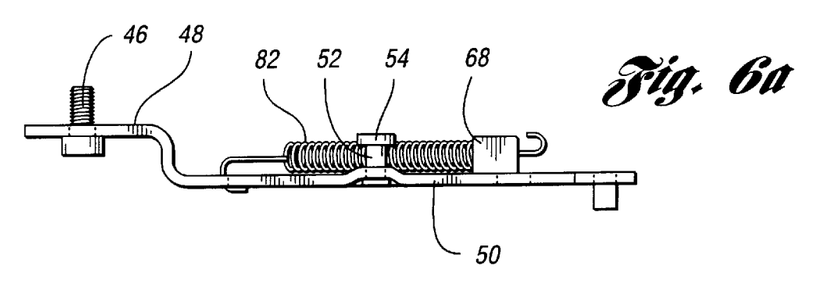
FIG. 6a is a top view of the latch plate of FIG. 6 as seen from the plane of section line 6a—6a of FIG. 6.
Figure 7:
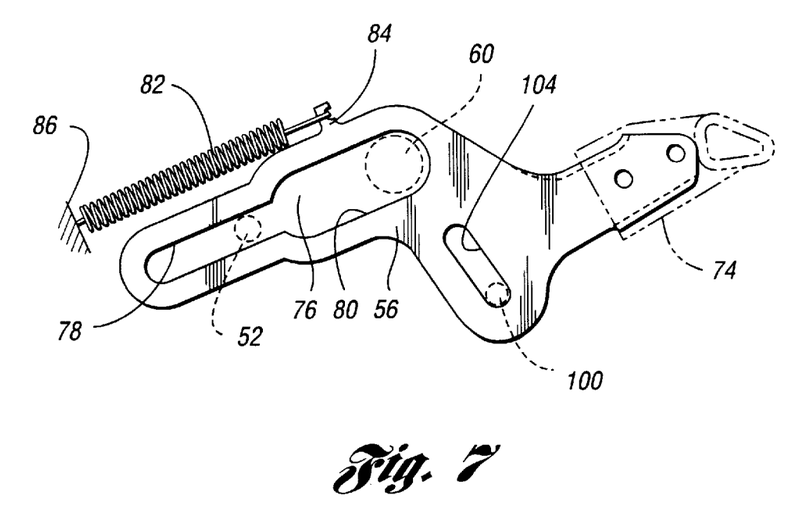
FIG. 7 is a side view of a movable latch plate that forms a part of the latch assembly of FIGS. 1–5.

A first fixed latch plate 44 is secured to the riser 14 by fasteners, such as the fastening bolt 46, thereby forming an integral part of the riser assembly. This fixed plate is seen also in FIGS. 6 and 6a. It includes a flat portion 48 which is bolted to the riser 14, as previously indicated. A second planar portion 50 is displaced from the portion 48 and extends parallel to the plane of the riser 14. A guide pin 52 is located in the planar portion 50 and is fixed to the planar portion 50 by a suitable fastening technique such as by using a force-fit or by welding. Guide pin 52 has a large diameter head 54 which guides the second latch plate 56, as seen in FIG. 7 as well as in FIG. 2.

The planar portion 50 of the fixed latch plate 44 has an opening 58 that receives a pivot pin 60, which is secured to and forms a part of a latch hook plate that will be described with reference to FIG. 9.

The pivot pin 60 extends in a normal direction relative to the plane of the riser 14 and the planar portion 50. As seen in FIG. 2, the end of the pin 60 is slotted to permit a connection with the inner end of a clock spring 62. The outer end of the clock spring 62 is locked to an anchor tang 64, which is punched out of the plane of the fixed latch plate portion 50 as seen in FIGS. 2 and 6. The clock spring 62 is pretensioned so that the pin 60 normally is biased in a clockwise direction as viewed from the perspective of FIG. 2.

The latch plate 44 is provided also with a fixed stop 68 formed integrally with the planar portion 50. Stop 68 extends in a normal direction relative to the planar portion 50 toward the plane of the riser 14. The stop 68 is positioned so that it is engaged by a first latch hook plate 70, which is rotatably supported on the pin 60. The point of engagement of the latch hook plate 70 with the stop 68 is shown in FIG. 2 at 72.

The adjustable latch plate 56 has a manually engageable grip portion that can be moved by a person engaged in the task of installing the seat in the vehicle passenger compartment or removing it through a rear hatch opening for the vehicle passenger compartment. The plate 56 includes an elongated slot, shown in FIG. 7 at 76, which extends in the direction of motion of the movable portion 74 as the latter is pulled linearly during installation or removal of the bench seat. The slot 76 includes a first narrow section 78 and a second relatively wider section 80. The pin 52, previously described with reference to FIG. 6a, is guided in the slot section 78 as the latch plate 56 is moved linearly during installation and removal of the bench seat.

The pin 60 is situated in the wider section 80 of the slot 76 as the plate 56 is guided in its linear travel. A tension spring 82 is situated between a spring anchor post 84 on the latch plate 56 and a spring anchor point 86 on the fixed latch plate 44, as seen in FIG. 2.

Figure 8:
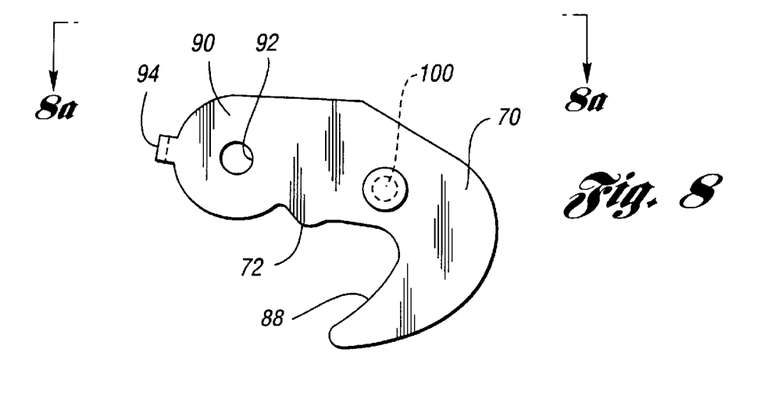
FIG. 8 is a side view of a latch hook that forms a part of the latch assembly of FIGS. 1–5.

The first latch hook plate, best seen in FIG. 8, comprises a hook portion 88 and inner portion 90, the latter being provided with a circular opening 92 that receives the pivot pin 60. The upper end of the latch hook plate 70 is provided with a stop element 94 that forms a part of the latch hook plate and extends perpendicularly relative to the plane of the latch hook plate toward the plane of the riser 14. When the latch plate 70 moves counterclockwise, as viewed from the perspective of FIG. 8, the stop element 94, after it travels a predetermined angular displacement, will engage shoulder 96 on the second latch hook plate 98, which will be described with reference to FIG. 9.

Figure 8A:
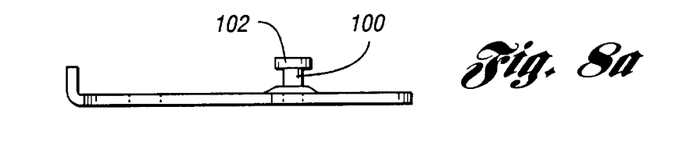
FIG. 8a is a side view of the latch hook of FIG. 8 as seen from the plane of section line 8a—8a of FIG. 8.

The latch hook plate 70 has a guide pin 100 secured at an intermediate location thereon. Guide pin 100, best seen in FIGS. 8 and 8a, is secured to the latch hook plate 70 and extends perpendicularly with respect to the plane of the latch hook plate. It is provided with an enlarged head 102 which guides the movable latch plate 56, described with reference to FIG. 7, as the pin 100 extends through an elongated slot 104 formed in the latch plate 56.

Figure 9:
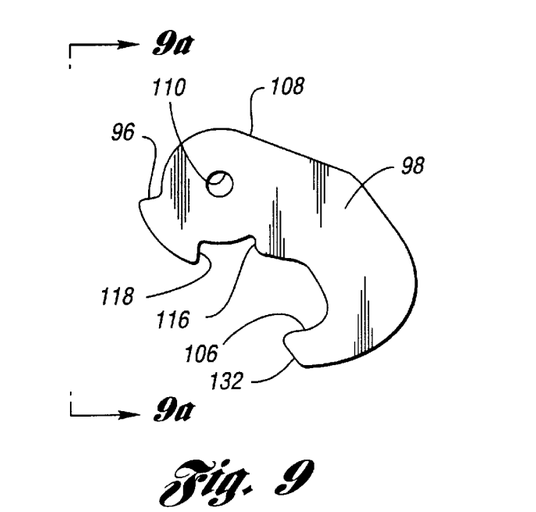
FIG. 9 is a side view of a second latch hook that forms a part of the latch assembly of FIGS. 1–5.
Figure 9A:
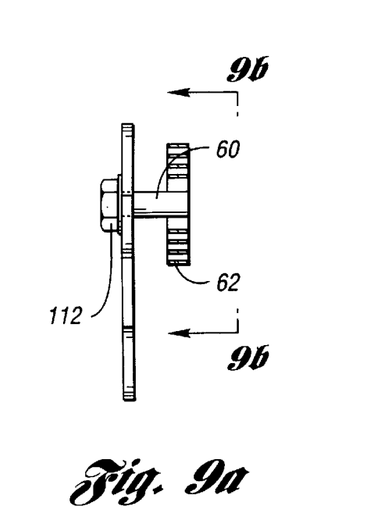
FIG. 9a is a side view of the latch hook of FIG. 9 as seen from the plane of section line 9a—9a of FIG. 9.
Figure 9B:
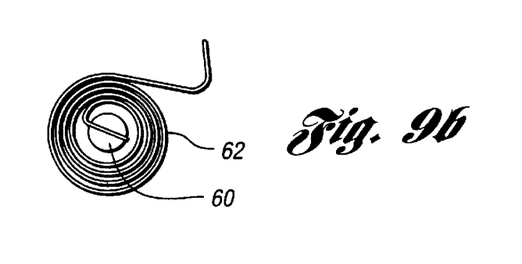

The second latch hook plate 98 is best seen in FIG. 9. It includes a hook portion 106 and an upper portion 108 which is provided with an opening 110 that receives pivot pin 60. The pin 60 extends through the hook plate 98, as best seen in FIG. 9a, and is fastened in the opening by suitable fastening techniques such as a threaded fastener 112.

The hook plate 98 is provided also with reaction shoulders 116 and 118 adjacent the hook portion 106.

As best seen in FIG. 2, the first and second latch hook portions 70 and 98 are hooked to and engage a locking pin or anchor pin seen in FIG. 2 at 120. This pin extends laterally through the roller well 28 and is anchored at each of its ends to the floor pan structure of the passenger compartment. The pin 120 is located below the surface of the floor pan as seen at 26 in FIG. 2. LEAR 0250 PUS -12

When the roller 22 is received in the roller well 28, the latch hook plate 70 and the latch hook plate 98 grip the pin 120. The roller 22 at that instant is below the latch hook plates. As the seat assembly is pushed into place in a forward direction, the roller 22 will ride down the sloped cam surface 122 of the roller well 28 until the latch assembly is positioned as shown in FIG. 2. Unlike prior art designs, such as the design shown in the previously described '398 patent, the roller 22 is fixed to the riser structure and is not raised as the latching mechanism assumes its locked position.

The roller well 30, as previously mentioned, receives the forward roller 24. Like the roller well 28, the roller well 30 has a cam surface 124 that permits the forward latching mechanism to become positioned within the roller well. As the bench seat is moved in a forward direction across the floor pan, the latching mechanism at the forward end of the bench seat assembly comprises a latch element 126, commonly referred to as a "PACMAN" element with an elastomeric cushion perimeter 128 which engages a locking pin 130 situated below the surface of the floor pan structure 26 and extending across the roller well 30. As the roller 24 drops in place as it rides down the cam surface 124, the latching element 126 will engage and become locked to the pin 130. At that instant, the latching mechanism in the roller well 28 at the rear of the bench seat will have become locked to the pin 120, thus preventing fore-and-aft motion of the seat as the seat is secured against upward movement by the latch hook plates.

A summary of the mode of operation of the latching mechanism now will be described.

As the bench seat is readied for removal, the movable latch plate 56 is pulled linearly in a rearward and upward direction. It moves against the opposing force of spring 82 as it is guided by the guide pin 52 and the pivot pin 60. The pin 100 then moves in the slot 104 as the first hook plate 70 rotates in a counterclockwise direction about the pin 60.

Further movement of the plate 56 will continue until shoulder 94 engages shoulder 96 on the hook plate 98. Upon still further movement of the movable plate 56 in a rearward and upward direction, the second hook plate 98 then will rotate in a counterclockwise direction until shoulder 118 engages the stop 68 formed on the fixed latch plate 44. Shoulder 116 on the hook plate 98 engages the shoulder 68 when it is in its fully locked position. Likewise, the first hook plate 70 engages the shoulder 68 at point 72 as previously described.

When the hook plates are in their extreme counterclockwise positions, the roller 22 can be ramped up the sloping surface 122. The seat then readily can be removed simply by rolling the bench seat along the floor pan structure 26.

Figures 3, 4:
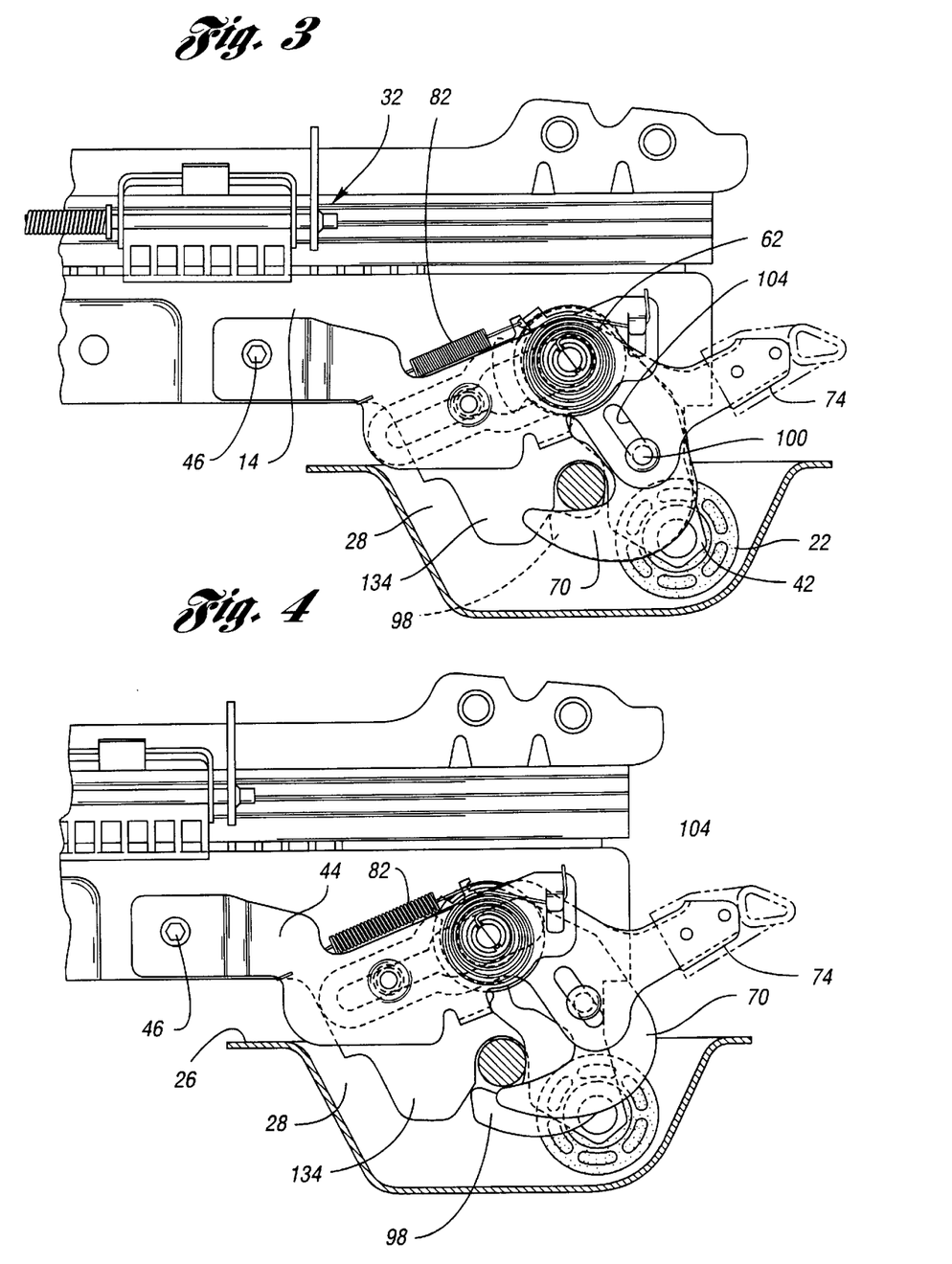
FIG. 3 is a view of the rearmost portion of the latching mechanism for the removable bench seat of FIG. 1 wherein the latch mechanism is in its bench seat latching position.
FIG. 4 is a view similar to FIG. 3 with the latching mechanism adjusted to its partially released position.

When the seat is to be installed, the rollers ride along the floor pan structure until they approach their respective roller wells. At that time, the movable plate 56 is pulled upwardly and rearwardly, thereby opening the first latch hook plate 70 to the partially retracted position shown in FIG. 4.

The second latch hook plate 98 is formed with a cam surface 132, as best seen in FIG. 9. That cam surface engages the locking pin 120 as the roller 122 enters the ramp surface 122. This will snap the second latch hook plate 98 against the opposing force of the clock spring 62 as the latching mechanism and the roller 22 drop in place in the roller well 28. That movement is accompanied simultaneously with movement of the roller 24 at the forward end of the bench seat assembly into the roller well 30 as the locking element 126 becomes engaged with the locking pin 130.

Figure 5:
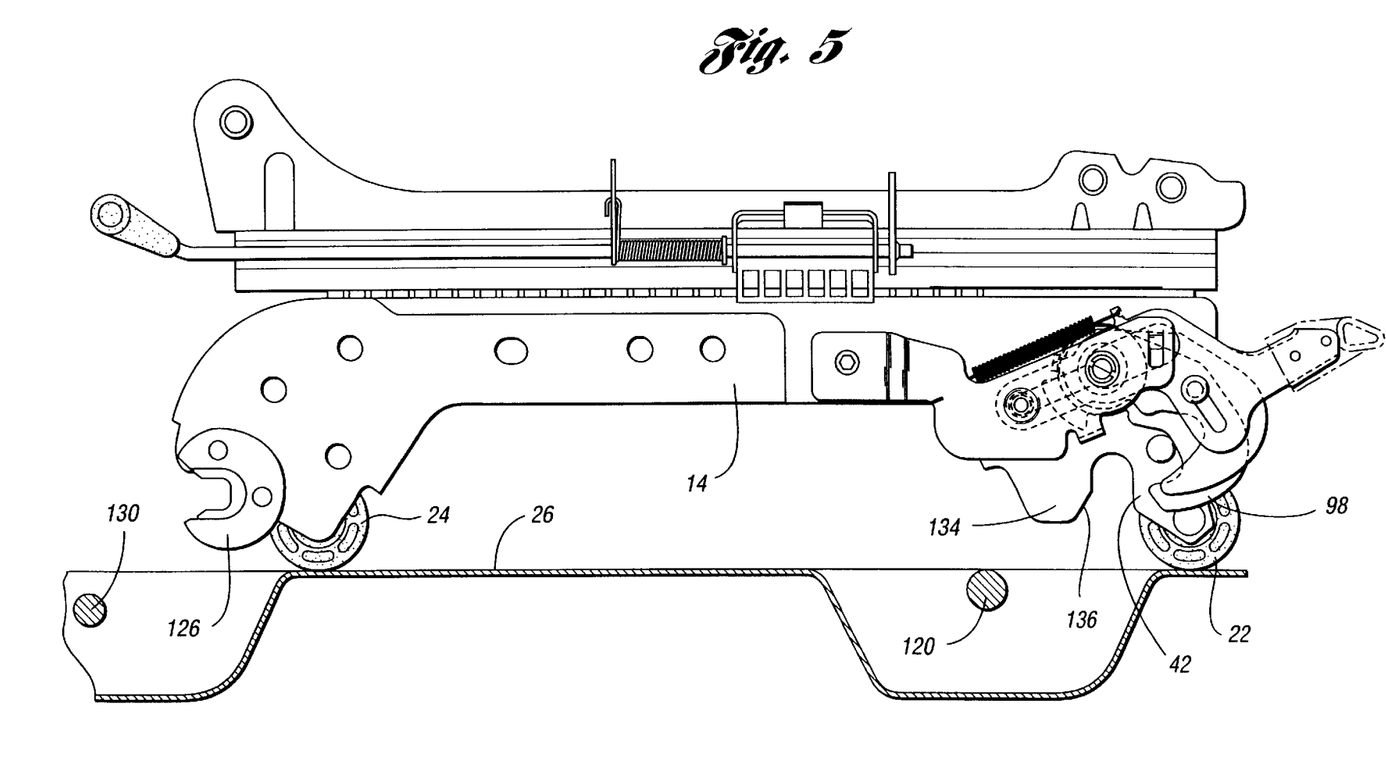
FIG. 5 is a view corresponding to FIGS. 3 and 4 showing the rear latch mechanism in its fully released position.

FIG. 5 shows the latching mechanism in its fully unlocked condition prior to its locking engagement with the pin 120. As best seen in FIG. 5, the riser 14 includes a cammed latch plate 134 with a lead-in cam surface 136 which guides the latching mechanism into its locking position over the pin 120 as the latching mechanism drops into its fully locked position. At that instant, the pin 120 is in registry with the space between the latch plate extension 134 and the portion 42 on which the wheel 22 is rotatably supported.

Although a particular embodiment of the invention has been disclosed, modifications may be made by persons skilled in the art without departing from the scope of the invention. The following claims are intended to cover all such modifications as well as equivalents thereof. What we claim and desire to secure by U.S. Letters patent is:

What is claimed is:

1. A bench seat assembly with a fore-and-aft axis for an automotive vehicle passenger compartment having a structural floor pan comprising:

a seat frame, said seat frame having a forward margin and a rearward margin a riser at each lateral side of said seat assembly supporting said seat frame;

front and rear seat rollers secured to each riser, said seat rollers being spaced, one with respect to the other, in the direction of said fore-and-aft axis;

said seat rollers further being located below said forward and rearward margins, respectively, and being mounted for rotation about fixed axes relative to the riser, said rollers being engageable with said floor pan to facilitate fore-and-aft movement of said seat assembly during installation and removal thereof;

a pair of roller wells spaced, one with respect to the other, in the direction of the fore-and-aft axis at forward and rearward locations in said floor pan on each lateral side of said seat assembly, each roller well being positioned relative to said seat assembly to receive one of said rollers;

a locking pin secured to said floor pan and extending transversely across each of said roller wells;

a latch on said riser adjacent to each of said front rollers, said latch being engageable with the locking pin for one of said forward roller wells when a front roller enters the one forward roller well;

an adjustable latch assembly adjacent to each of said rearward rollers including a fixed latch plate secured to one of said risers, a downwardly extending recess in said fixed latch plate that receives the locking pin for one of said rearward roller wells as the adjacent one roller enters one rearward roller well thereby latching said seat assembly against fore-and-aft movement;

a linearly movable latch plate mounted for linear motion relative to said fixed latch plate;

a latch hook plate mounted for pivotal motion relative to said fixed latch plate;

a mechanical connection between said movable latch plate and said latch hook plate including means for translating linear motion of said movable latch plate to pivotal motion of said latch hook plate; and a spring means for normally urging said movable latch plate toward said locking pin whereby said latch hook plate normally engages said locking pin to secure said riser against upward movement relative to said floor pan as said fixed latch plate secures said riser against fore-and-aft movement relative to said floor pan.

2. The bench seat assembly set forth in claim 1 wherein said fixed latch plate includes a fixed latch plate guide pin supported thereon and a pivot pin supported on said fixed latch plate and extending therethrough;

said movable plate having an elongated opening receiving said guide pin and said pivot pin whereby said guide pin and said pivot pin accommodate linear movement of said movable latch plate.

3. The bench seat assembly set forth in claim 2 wherein said means for translating linear motion comprises a slot formed in said movable latch plate extending generally radially outward from said pivot pin and a latch hook plate guide pin in said slot whereby linear motion of said movable latch plate effects rotary movement of said latch hook plate about said pivot pin.

4. A bench seat assembly with a fore-and-aft axis for an automotive vehicle passenger compartment having a structural floor pan comprising:

a seat frame, said seat frame having a forward margin and a rearward margin;

a riser at each lateral side of said seat assembly supporting said seat frame;

front and rear seat rollers secured to each riser, said seat rollers being spaced, one with respect to the other, in the direction of said fore-and-aft axis;

said seat rollers further being located below said forward and rearward margins, respectively, and being mounted for rotation about fixed axes relative to the riser, said rollers being engageable with said floor pan to facilitate fore-and-aft movement of said seat assembly during installation and removal thereof;

forward and rearward roller wells in said floor pan on each lateral side of said seat assembly, said roller wells being spaced, one with respect to the other, in the direction of the fore-and-aft axis, each roller well being positioned relative to said seat assembly to receive one of said rollers;

a locking pin secured to said floor pan and extending transversely across each of said roller wells;

a latch on said riser adjacent to each of said front rollers, said riser being engageable with the locking pin for one of said forward roller wells when a front roller enters the one forward roller well;

an adjustable latch assembly adjacent to each of said rearward rollers including a fixed latch plate secured to one of said risers, a downwardly extending recess in said fixed latch plate that receives the locking pin for one of said rearward roller wells as the adjacent one roller enters one rearward roller well thereby latching said seat assembly against fore-and-aft movement;

a linearly movable latch plate mounted for linear motion relative to said fixed latch plate;

a first latch hook plate mounted for pivotal motion relative to said fixed latch plate;

a mechanical connection between said movable latch plate and said latch hook plate including means for translating linear motion of said movable latch plate to pivotal motion of said latch hook plate;

a first spring means for normally urging said movable latch plate toward said locking pin whereby said latch hook plate normally engages said locking pin to secure said riser against upward movement relative to said floor pan as said fixed latch plate secures said riser against fore-and-aft movement relative to said floor pan;

a second latch hook plate, a pivot pin being secured to said second latch hook plate and rotatable therewith; and a second spring means between said fixed latch plate and said pivot pin for normally urging said second latch hook plate toward said locking pin to secure said bench seat assembly to said floor pan.

5. The bench seat assembly set forth in claim 4 wherein said second latch hook plate has a cam surface at its lowermost extremity, said cam surface being engaged by said locking pin and rotated against the force of said second spring means as said rearward rollers are moved into said rearward roller wells during installation of said bench seat assembly.

6. The bench seat assembly set forth in claim 2 wherein said rearward rollers are engageable with said floor pan at a point below the lower extremities of said latch plates.

* * * * *